US 6,627,834 B1

(12) United States Patent
Moro et al.

(10) Patent No.: US 6,627,834 B1
(45) Date of Patent: *Sep. 30, 2003

(54) WIRE ELECTRICAL DISCHARGE APPARATUS

(75) Inventors: Toshio Moro, Tokyo (JP); Shiro Imai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/402,494

(22) PCT Filed: Feb. 5, 1998

(86) PCT No.: PCT/JP98/00469

§ 371 (c)(1),
(2), (4) Date: Oct. 5, 1999

(87) PCT Pub. No.: WO99/39859

PCT Pub. Date: Aug. 12, 1999

(51) Int. Cl.[7] .................................................. B23H 7/10
(52) U.S. Cl. .............................. 219/69.12; 219/137.61; 226/97.4; 226/108
(58) Field of Search ......................... 219/69.12, 137.61; 29/33 F, 34 D, 746, 452; 451/168; 226/97.4, 108

(56) References Cited

U.S. PATENT DOCUMENTS 4,991,762 A * 2/1991 Fabrri ........................ 226/108
6,150,626 A * 11/2000 Moro et al. ............... 219/69.12

FOREIGN PATENT DOCUMENTS

| EP | 2233924 | * 1/1991 | ............. 219/69.12 |
| JP | 47-1840 | 1/1972 | |
| JP | 55-164436 | * 12/1980 | ............. 219/69.12 |
| JP | 59-143631 | 9/1984 | |
| JP | 60-104618 | * 6/1985 | ............. 219/69.12 |
| JP | 62-162427 | * 7/1987 | ............. 219/69.12 |
| JP | 1-278818 | * 1/1989 | ............. 219/69.12 |
| JP | 4-72648 | 11/1992 | |

OTHER PUBLICATIONS

Inoue, "Wire Guide Device for Wire–Cut Electrospark Machining", Full English Translation of Japanese Patent Publication JP 6 104618, Jun. 1985.*

* cited by examiner

Primary Examiner—A. Dexter Tugbang
(74) Attorney, Agent, or Firm—Sughrue Mion, PLLC (57) ABSTRACT

The shape of each electrical supply die for contact-supplying electricity to a wire electrode is changed to a cylindrical shape, and grooves are provided in its outer surface in parallel to the traveling direction of the wire, wherein upper electric supply is effected by contact-supplying of electricity at a projecting surface formed between adjacent ones of the grooves, while lower electric supply is effected by pressure contact-supplying of electricity by causing a concave surface to contact the groove.

6 Claims, 6 Drawing Sheets

WIRE ELECTRICAL DISCHARGE APPARATUS

TECHNICAL FIELD

The present invention relates to a wire electrical discharge apparatus, and more particularly to a wire electrical discharge apparatus which permits stable supply of electricity to a wire electrode and improves the service life of electrical supply members by suppressing abnormal wear due to vibrations accompanying the traveling of the wire electrode.

BACKGROUND ART

In general, a wire electrode (hereafter referred to as the wire), after processing a workpiece, is further fed continuously in a downstream direction. As for the passed wire after processing, discharge craters are formed on the wire surface due to the effect of discharge energy supplied for processing, so that the wire surface is roughened and is microscopically an irregular surface. For this reason, on the contact surface of a lower electrical supply member, e.g., a lower electrical supply die, which is disposed downstream, the wire travels while the roughened surface is brought into contact with the lower electrical supply die. Further, vibrations of the wire accompanying the travel are added, and states of contact and half contact are produced, so that very small arc discharges occur locally between the surfaces of the wire and the lower electrical supply member. Consequently, the surface of the lower electrical supply die is roughened, and the wire which is softer than the material of the lower electrical supply die is mechanically cut, and wire dust is produced.

The supply of electricity to the wire of the wire electrical discharge apparatus is an extremely important element in continuing the processing, and although various attempts have been made to improve stable electrical supply to the narrow wire, the present situation is such that sufficient achievements have not yet been obtained. As a conventional electrical supply member, as disclosed in Japanese Patent Examined Publication No. 14374/1987 or Japanese Patent Unexamined Publication No. 2417/1992, an electrical supply member is known in which a hollow cylindrical die having a small diameter allowing the wire to pass therethrough is fitted and fixed to an upper wire guide and a lower wire guide which are respectively arranged above and below a workpiece or are arranged to clamp the workpiece, and contact supplying of electricity is effected at a small-diameter inner surface provided in the center of the hollow cylindrical electrical supply die. However, this conventional electrical supply member has a diameter several times larger than that of the wire to allow a working fluid to pass through the small-diameter portion to cool the discharge heat accompanying the contact. For this reason, discharge takes place between the contact surfaces of the wire and the electrical supply die as processing advances, with the result that the electrical supply die becomes worn, and the positions of electrical supply surfaces that can be used have been limited to several locations. Furthermore, in this case, it is necessary to cut the small-diameter hole in the electrical supply die, so that hole cutting has therefore been difficult, and there has been a drawback in that the cost of the electrical supply die becomes high.

According to this conventional technique, however, since the electrical supply surfaces for the wire are small-diameter inner surfaces and are concave, the electrical supply surfaces have the effect of suppressing the vibration of the wire, with the result that the electrical supply die sufficiently comes into contact with the wire which has passed after processing the workpiece. Hence, although the service life of the electrical supply die is short, stable processing is possible.

In addition, as the second prior art, to make improvements over the drawbacks of the above-described first prior art, as disclosed in, for example, Japanese Utility Model Examined Publication No. 3026199, there is an electrical supply member in which the electrical supply die formed in a cylindrical or prismatic shape instead of the hollow cylindrical shape, and electrical supply surfaces are formed on its outer surface. As compared with the above-described electrical supply member having the hollow cylindrical shape, external contact is established, so that the outer shape of the electrical supply die can be set to be large, and positions for causing contact supplying of electricity can be provided in a greater number. For this reason, the number of times in the replacement frequency due to the wear of the electrical supply die decreases, making it possible to hold down the maintenance cost. However, since the electrical supply member of this second conventional art employs cylindrical external electrical supply, there is a drawback in that the contact surface becomes a convex surface, so that the traveling wire does not stabilize. Hence, trouble has been encountered in which because of an increase in the discharge phenomenon due to the runout of the wire during traveling, the contact surface of the electrical supply die becomes roughened and cuts the wire, resulting in such as the occurrence of wire dust.

To control this situation, there arise such inconveniences as the need to restrain the wire traveling speed and to hold down electric energy supplied to the wire, so that there have been cases where difficulties are caused to processing. Further, the aforementioned wire dust causes clogging in the wire guide located on the downstream side in the wire feeding direction between the wire guides which are set at positions for clamping the electrical supply die therebetween.

The present invention has been devised to eliminate the above-described drawbacks of the conventional art, and it is a primary object of the present invention to enlarge the outer shape of the electrical supply member and to prevent the production of erosion dust of the wire caused by the roughened surface of the electrical supply member by presenting the lateral runout of the traveling wire, which has passed after processing, due to its vibration or the like, thereby preventing unstable processing or preventing the clogging occurring in the downstream wire guide.

Further, a second object is to make the upper electrical supply member and the lower electrical supply member identical in shape, thereby preventing an increase in the kinds of component parts and lowering the maintenance cost.

Further, a third object is to permit accurate indexing to enable the use of the electrical supply members a plurality of times and to prevent a faulty indexing position.

Further, a fourth object is to prolong the life of the electrical supply members in conjunction with the extension of processing time due to automated operation and the like by adopting a material of higher hardness so as to improve the service life of the electrical supply member.

Further, since the need to attach or detach the electrical supply member easily has been required in the light of operating efficiency, a fifth object is to allow the electrical supply to be easily attached or detached by using a jig or the like and to facilitate the indexing of the electrical supply member.

Further, a sixth object is to enable use of the electrical supply number at a greater number of indexed positions so as to make effective use of the electrical supply members.

DISCLOSURE OF THE INVENTION

In accordance with the present invention, there is provided a wire electrical discharge apparatus for processing a workpiece by generating a discharge with a working fluid disposed between a wire electrode and the workpiece, said wire electrical discharge apparatus including a first guide and a second guide which are disposed in face-to-face relationship with the workpiece placed therebetween and respectively have electrical supply members for supplying electricity to the wire electrode, characterized in that said first guide is disposed on an upstream side in a wire feeding direction with respect to said second guide, a plurality of groove portions are formed in a surface of said electrical supply member provided in said second guide in such a manner as to extend in a traveling direction of the wire electrode, and said groove portions form electrical supply portions with respect to the wire electrode.

In addition, in the wire electrical discharge apparatus of the present invention said electrical supply member provided said first guide is structured in the same shape as that of said electrical supply member provided said second guide.

In addition, in the wire electrical discharge apparatus of the present invention, a plurality of groove portions are formed in a surface of said electrical supply member provided in said first guide in such a manner as to extend in the traveling direction of the wire electrode, electrical supply portions of said electrical supply member with respect to the wire electrode are each formed by a projecting portion between adjacent ones of groove portions formed in a surface of said electrical supply member, each of said electrical supply portions of said electrical supply member provided in said second guide with respect to the wire electrode is formed by each of said groove portions, and retaining portions in a number identical to that of the number of said groove portions formed in the surface of each of said electrical supply members are formed on each of said electrical supply members for controlling rotation of said electrical supply member.

In addition, in the wire electrical discharge apparatus of the present invention, the material of each of said electrical supply members is formed of a powder sintered metal or a material having properties similar thereto, and the surface of each of said electrical supply members is coated with a carbide or a nitride.

In addition, in the wire electrical discharge apparatus of the present invention, attachment and detachment of each of said electrical supply members are effected by using a drawing-out member which engages said electrical supply member, and said drawing-out member is provided with a rotation stopping member formed of a resilient member and permitting indexing of an electricity-supplying position of said electrical supply member.

In addition, in the wire electrical discharge apparatus of the present invention, a rotation stopping member disposed at an electrical supply portion formed in said electrical supply member provided in said first guide with respect to the wire electrode and a rotation stopping member disposed at an electrical supply portion formed in said electrical supply member provided in said second guide with respect to the wire electrode are arranged at angles which are different by an angle formed by said groove portion formed in said guide and an adjacent groove portion with respect to a central portion of said electrical supply member.

BRIEF DESCRIPTION OF THE DRAWINGS

FIGS. 5(a) and (b) are diagrams explaining the indexing of the upper electrical supply die, shown in FIG. 1, in its rotating direction;

FIGS. 6(a) and (b) are diagrams explaining the indexing of the lower electrical supply die, shown in FIG. 1, in its rotating direction;

BEST MODE FOR CARRYING OUT THE INVENTION

First Embodiment

Figure 1:
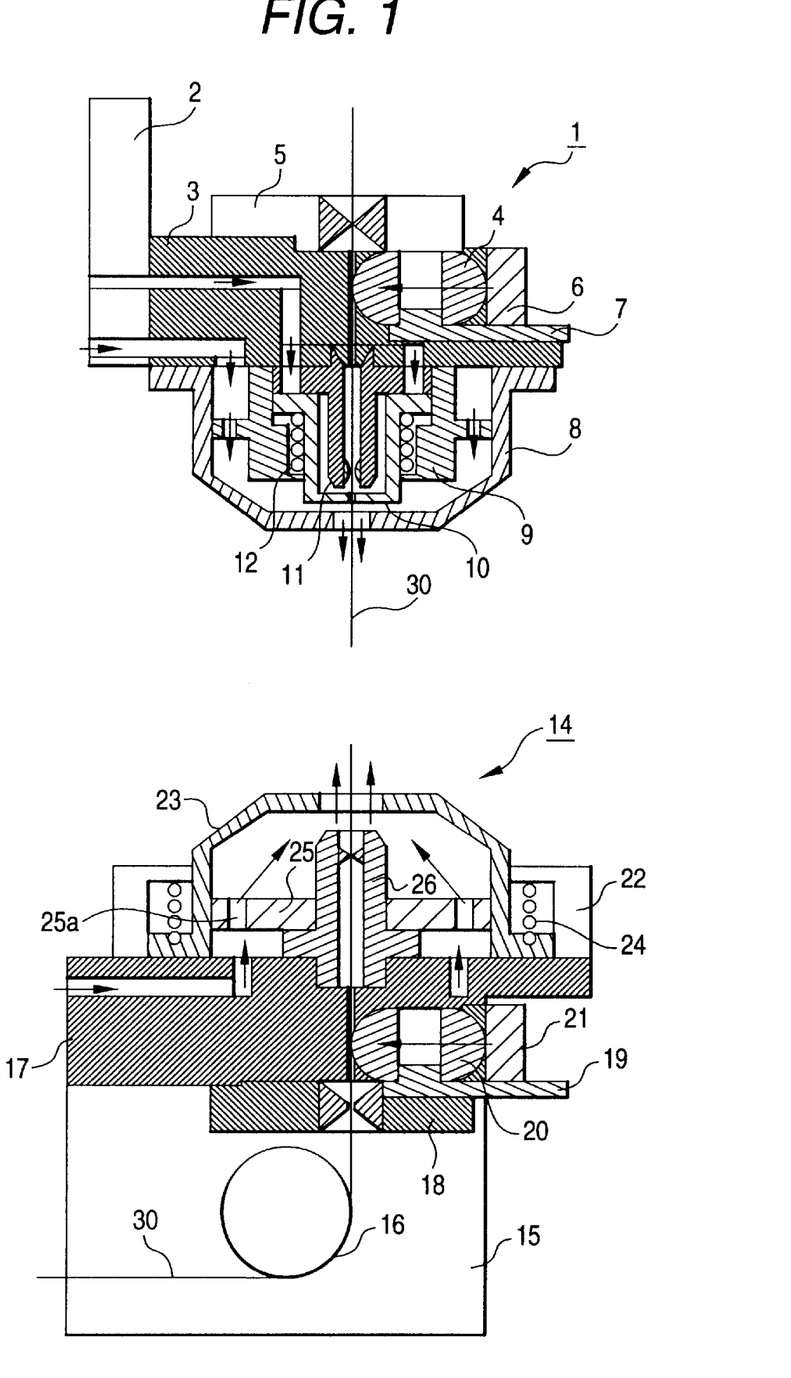
FIG. 1 is a schematic diagram of an upper guide and a lower guide for guiding a wire in a wire electrical discharge apparatus in accordance with an embodiment of the present invention.

FIG. 1 is a schematic diagram of an upper guide and a lower guide for guiding a wire in a wire electrical discharge apparatus in accordance with an embodiment of the present invention.

In the drawing, reference numeral 1 denotes an upper guide which is fixed to an unillustrated main shaft through a mounting plate 2. Reference numeral 3 denotes an upper block which includes an upper electrical supply member, e.g., an upper electrical supply die 4, and is arranged such that the upper electrical supply die 4 is clamped by an upper plate 5, and the upper electrical supply die 4 is firmly brought into pressure contact with the upper block 3 by a first pressing plate 6. Numeral 7 denotes a first drawing-out member, e.g., a first drawing-out plate, which is used for attaching and detaching the electrical supply die 4. Numeral 8 denotes an upper nozzle, and 9 denotes a nozzle housing, in which a jet nozzle 10 is movably supported by a spring 12, an upper guide holder 11 being fixed to the upper block 3 therein.

Further, reference numeral 14 denotes a lower guide, and numeral 15 denotes a roller housing, in which a roller 16 for changing the direction of a wire 30 is rotatably supported, and a lower block 17 is attached thereto. Numeral 18 denotes a lower plate which is disposed between the roller housing 15 and the lower block 17, and is used to clamp a lower electrical supply member, e.g., a lower electrical supply die 20, together with the lower block 17. Numeral 19 denotes a second drawing-out member for the lower electrical supply die 20, e.g., a second drawing-out plate, which is arranged in the same way as the first drawing-out plate 7, whereby the attachment and detachment of the lower electrical supply die 20 is possible.

Numeral 21 denotes a second pressing plate for firmly fixing the lower electrical supply die 20 to the lower block 17, and numeral 22 denotes a pressing member for fixing a lower nozzle 23. The pressing member 22 incorporates therein a spring 24 which makes the lower nozzle 23 vertically movable, thereby constantly pressing the lower nozzle 23 downward. Numeral 25 denotes a plate fixed to a lower guide holder 26 in which a passage 25a for passage of a working fluid is formed.

Figure 2:
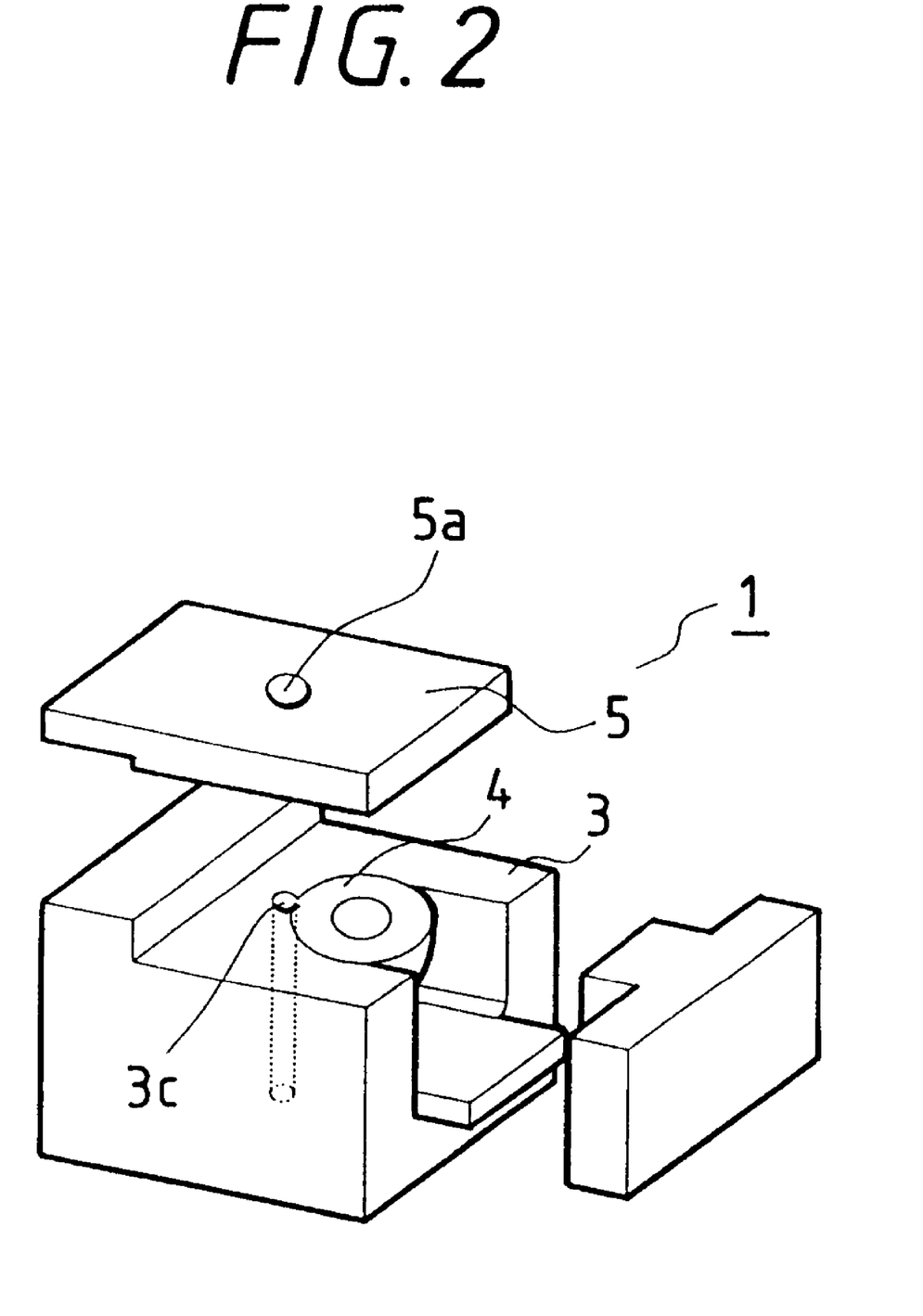
FIG. 2 is an exploded perspective view of the upper guide shown in FIG. 1.

FIG. 2 illustrates an exploded perspective view of the upper guide 1 shown in FIG. 1, and illustrates a state in which the upper electrical supply die 4 is accommodated in the upper block 3. As shown in FIG. 2, an upper auxiliary guide 5a for allowing the passage of the wire and for guiding the wire is formed in the upper plate 5, and a wire passage 3c is similarly formed in the upper block 3.

Figures 3A, 3B, 3C:
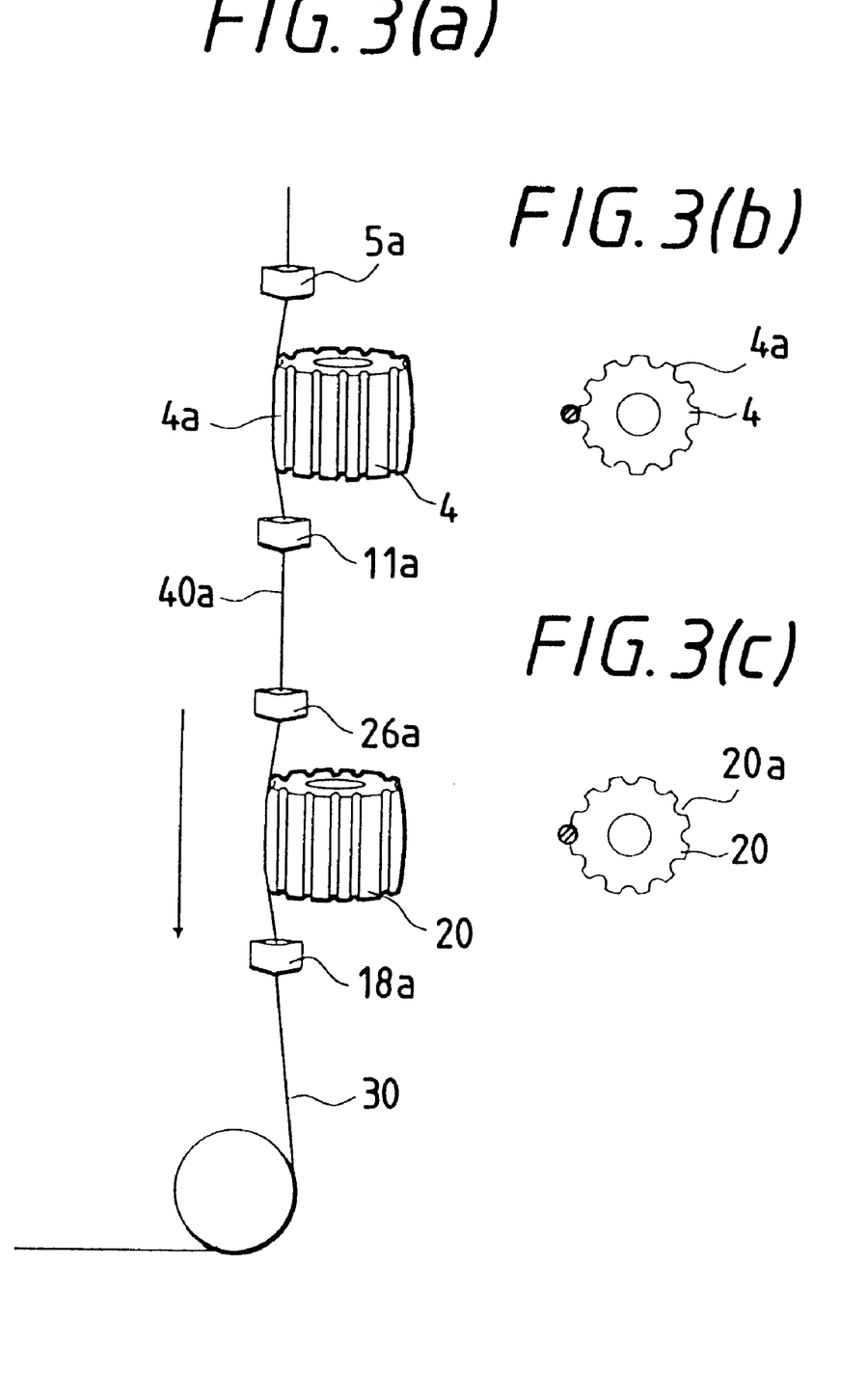
FIG. 3(a)–FIG. 3(c) are diagrams illustrating details of the shapes of an upper electrical supply die and a lower electrical supply die shown in FIG. 1.

FIGS. 3(a) to 3(c) illustrate the details of the upper electrical supply die and the lower electrical supply die shown in FIG. 1, in which FIG. 3(a) is a perspective view, FIG. 3(b) is a plan view of the upper electrical supply die 4, and FIG. 3(c) is a plan view of the lower electrical supply die 20. A plurality of grooves are provided in an outer periphery of the upper electrical supply die 4, and projecting surfaces each located between adjacent ones of grooves form upper electrical supply portions 4a for contacting the wire 30 to supply electricity. As for the lower electrical supply die 20 as well, lower electrical supply portions 20a are formed by concave surfaces and convex surfaces provided on its outer periphery, and contact-supply electricity to the wire 30. As will be described later, the lower electrical supply portions 20a are formed by grooves formed in the outer periphery of the lower electrical supply die 20.

As the contact between the wire 30 and each electrical supply die, the arrangement provided is such that the upper electrical supply die supplies electricity by means of the auxiliary guide 5a and an upper guide 11a, while the lower electrical supply die 20 is brought into pressure contact with the wire 30 by means of a lower guide 26a and a lower auxiliary guide 18a. The wire 30 is tensioned by being deformed in a chevron shape by the electrical supply die 4, and a force for pressing the electrical supply die 4 acts as its reaction force, thereby making it possible to maintain contact supplying of electricity during processing. However, at the same time that processing progresses, the wire 30 gradually advances in the direction of arrow in FIG. 3(a), and advances from the position of 4a to the position of 40b, and at the point of time when the force for pressing the electrical supply die 4 has ceased to be applied, electrical supply becomes impossible and processing stops.

Figure 4:
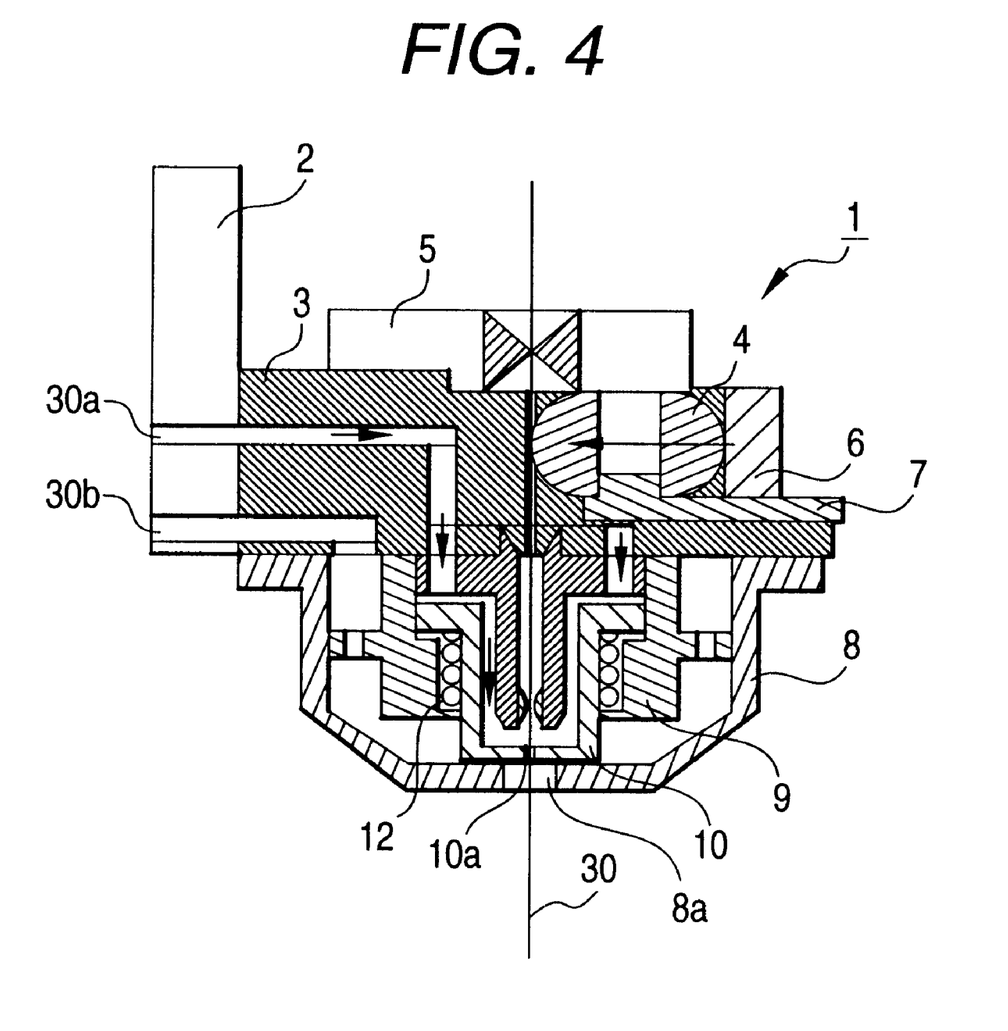
FIG. 4 is a diagram explaining the function of the upper guide shown in FIG. 1.

FIG. 4 explains the function of the upper guide 1, and when a working fluid is supplied to a jet stream passage 30a, the jet nozzle 10 is moved downward by its pressure, and jets a jet stream from a nozzle 10a. The wire 30 passes through the interior of this jet stream, and the wire 30 is guided to the lower guide located below. During normal processing, the working fluid is supplied from a passage 30b, and the working fluid is supplied from a nozzle 8a. In that case, the jet nozzle 10 is retracted upward.

Second Embodiment

Figure 5:
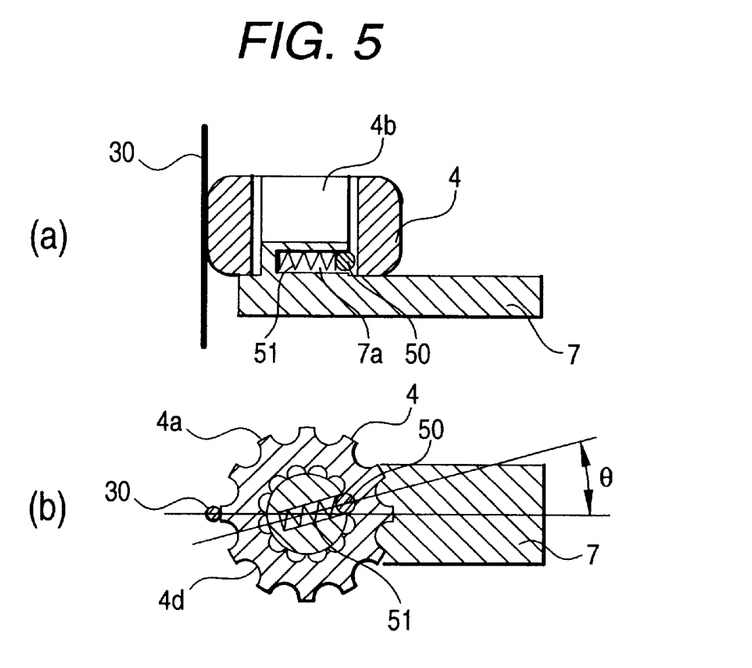
Figure 6:
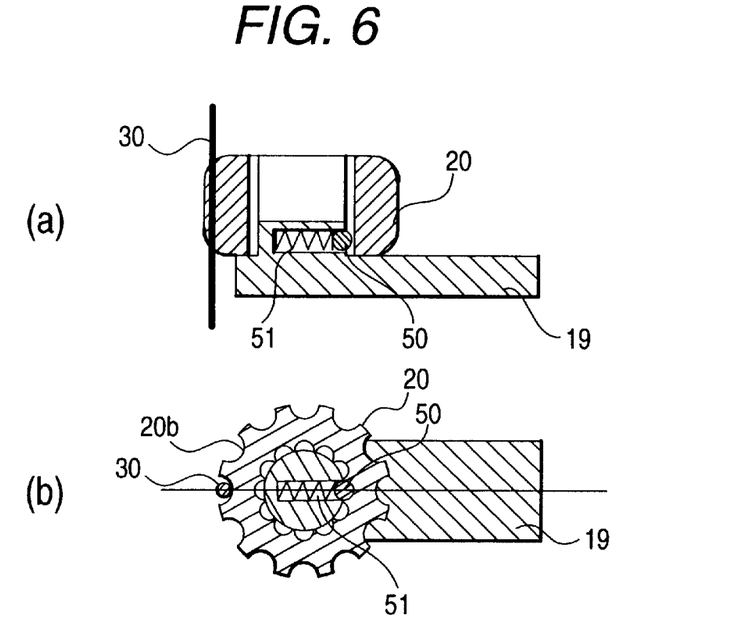

FIGS. 5 and 6 are diagrams explaining the indexing of the rotating direction of the upper electrical supply die 4 and the lower electrical supply die 20 as well as their rotation stopping mechanisms, and the parts (a) of the respective drawings show front cross-sectional views, and the parts (b) thereof show plan views. Here, a description will be given of the upper electrical supply die 4 in FIG. 5, but the same holds true of the lower electrical supply die 20 in FIG. 6.

A portion of a distal end portion of the drawing-out plate 7 is engaged in a hole 4b provided in the center of the upper electrical supply die 4. Grooves 4d in the same number as the number of the electricity supplying grooves are provided in the hole 4b. A ball 50 is constantly pressed in an outward direction by a spring 51 incorporated in a hole 7a provided in the distal end portion of the drawing-out plate 7, and is engaged in the groove 4d. The direction in which this ball 50 is fitted is in a relationship of being inclined by an angle as illustrated in the drawing, and, in this state, the electrical supply portion 4a of the upper electrical supply die 4 comes into pressure contact with the wire 30. It should be noted that, in the lower electrical supply die 20, since the angle q at which the ball 50 is fitted is zero, the wire 30 comes into pressure contact with a groove-shaped electrical supply portion 20b.

Concerning the rotation of the upper electrical supply die 4, if its outer portion is firmly turned, the ball 50 retracts in the hole 7a and projects where it is accommodated in an ensuing groove 4d, thereby completing the indexing of the upper electrical supply die 4 in its rotating direction. When the electrical supply portion in use has become unusable, the upper electrical supply die 4 can be easily turned to an ensuing electrical supply portion in the above-described procedure, and can be positioned. This can be simply carried out in a similar method for both the upper electrical supply die 4 and the lower electrical supply die 20. In other words, by offsetting the phase of the upper and lower electrical supply portions by the angle q, both the concave surfaces and the convex surfaces at the outer surface of the electrical supply dies are made usable, and the frequency of use is increased, thereby reducing the cost per frequency of use.

It should be noted that although, as the means for controlling the rotation of the electrical supply dies 4 and 20, a case has been illustrated and described in which the grooves 4d are formed in the electrical supply dies, the present invention is not confined to the same, and an arrangement may be provided such that a retaining portion is provided on the upper surface or bottom surface of each of the electrical supply dies 4 and 20, thereby controlling the rotation of the electrical supply dies.

Third Embodiment

Figure 7:
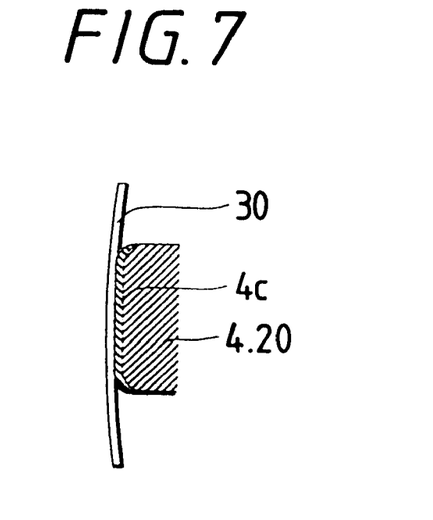
FIG. 7 is a diagram illustrating an embodiment in which a surface layer portion of the electrical supply die is provided with a coating.
Figure 8:
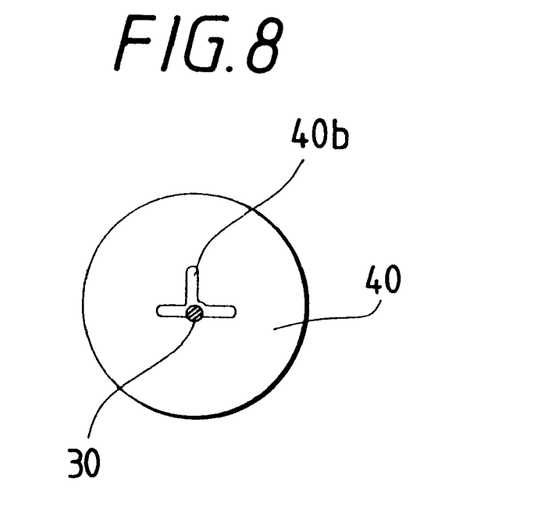
FIG. 8 is a plan view of the lower electrical supply die.

FIG. 7 shows still another embodiment of the present invention, and illustrates an example in which surface layer portions of the upper electrical supply die 4 and the lower electrical supply die 20 are respectively provided with coatings 4c. Conventionally, powder sintered metal (a cemented carbide material or a material similar thereto) has been generally used. In portions of contact between the wire 30 and the upper electrical supply die 4 or the lower electrical supply die 20, a phenomenon occurs in which the wire 30 microscopically moves away instantly from the upper electrical supply die 4 or the lower electrical supply die 20 due to the runout of the wire 30 caused by such as its traveling, and an arc discharge is formed at that portion, processing the upper electrical supply die 4 or the lower electrical supply die 20. This instant dissociation phenomenon occurs constantly during processing, and even though the amount of the electrical supply die thereby processed is small, removal of the upper electrical supply die 4 or the lower electrical supply die 20 advances due to its accumulation, and as can be seen in the plan view of a lower electrical supply die 40 shown in FIG. 8, a groove 40b is formed, and if this groove 40b grows over a fixed distance, it becomes impossible to maintain contact, so that processing becomes impossible. This is the life of the electrical supply die 40 at one location. The results of an experiment revealed that practically no wear due to friction occurs, and the wear in most of the life is caused by discharge removal due to very small arc discharges, as described above. To protect the electrical supply die from wear due to these very small arc discharges, by providing a thin coating by means of chemical vapor deposition (CVD) by using a processing material, such as a carbide or a nitride, which has higher hardness than cemented carbide, i.e., the base material, and has an electrically conducting property, the arc resistance can be improved, and the service life can be prolonged substantially. Specifically, silicon carbide (SiC) is effective as the carbide, and titanium carbide as the nitride, for example.

As described above in detail, in the wire electrical discharge apparatus in accordance with a first aspect of the invention, the shape of each electrical supply die for contact-supplying electricity to the wire electrode is changed to a cylindrical shape, grooves are provided in its outer surface in parallel to the traveling direction of the wire, the upper electric supply is effected by contact-supplying of electricity at the projecting surface formed between the grooves, and the lower electric supply is effected by pressure contact-supplying of electricity at the concave surface in the groove. Hence, it is possible to increase the frequency of use of the electrical supply portions, and prevent erosion of the wire electrode. As a result, it is possible to prolong the service life and prevent the shutdown of the machine due to the production of wire dust and the like.

In addition, in the wire electrical discharge apparatus in accordance with a second aspect of the invention, the upper electrical supply die and the lower electrical supply die are formed into component parts of the same shape, and are made interchangeably usable, so that it is possible to reduce the number of kinds of the electrical supply die and reduce the manufacturing cost.

In addition, in the wire electrical discharge apparatus in accordance with a third aspect of the invention, grooves or projections in a number identical to the number of grooves which are formed in the outer surface of the electrical supply die are provided in the central hole, the bottom surface, or the upper surface of the electrical supply die so as to facilitate the positioning of the electrical supply die in its rotating direction. Hence, the indexing of the electrical supply die can be effected easily and reliably.

In addition, in the wire electrical discharge apparatus in accordance with a fourth aspect of the invention, as the material of each of said electrical supply members, a powder sintered metal such as cemented carbide, or a material having properties similar thereto, is provided with a single layer or a multiple layer of coating with such as a carbide (SiC: silicon carbide) or a nitride (TiN: titanium nitride). Hence, it is possible to substantially improve the service life of the electrical supply portions.

In addition, in the wire electrical discharge apparatus in accordance with a fifth aspect of the invention, to facilitate the attachment and detachment of each of said electrical supply members, a drawing-out member is engaged with said electrical supply member, and said drawing-out member is provided with a rotation stopping member formed of a resilient member and permitting the indexing of the electricity-supplying position of said electrical supply member by engaging one of grooves formed in the central hole, the bottom surface, or the upper surface of the electrical supply die, the number of the grooves being identical to the number of grooves which are formed in the outer surface of the electrical supply die.

In addition, in the wire electrical discharge apparatus in accordance with a sixth aspect of the invention, in the rotation stopping mechanisms provided in the drawing-out members for drawing out the respective electrical supply dies in the upper and lower guides, the upper and lower rotation stopping mechanisms are respectively arranged at angles which are different by an angle formed by adjacent ones of the grooves provided in the outer surface of each electrical supply die. Therefore, after the upper electrical supply die is used, the upper electrical supply die can be used for lower electric supply, or after the lower electrical supply die is used, the lower electrical supply die can be used for upper electric supply interchangeably.

INDUSTRIAL APPLICABILITY

As described above, the wire electrical discharge apparatus in accordance with the present invention is suitable as a wire electrical discharge apparatus which permits stable supply of electricity to the wire electrodes, and improves the service life of the electrical supply members by suppressing abnormal wear due to the vibration accompanying the traveling of the wire electrodes.

What is claimed is:

1. A wire electrical discharge apparatus for processing a workpiece by generating a discharge with a working fluid disposed between a wire electrode and the workpiece, said wire electrical discharge apparatus including a first guide and a second guide which are disposed in face-to-face relationship with the workpiece placed therebetween and respectively have electrical supply members for supplying electricity to the wire electrode, wherein said first guide is disposed on an upstream side in a wire feeding direction with respect to said second guide, a plurality of groove portions are formed in a surface of said electrical supply member provided in said second guide in such a manner as to extend in a traveling direction of the wire electrode, and said groove portions form electrical supply portions with respect to the wire electrode.

2. The wire electrical discharge apparatus according to claim 1, wherein said electrical supply member provided in said first guide is structured in the same shape as that of said electrical supply member provided in said second guide.

3. The wire electrical discharge apparatus according to claim 2, wherein the plurality of groove portions are formed in the surface of said electrical supply member provided in said first guide in such a manner as to extend in a traveling direction of the wire electrode, electrical supply portions of said electrical supply member with respect to the wire electrode are each formed by a projecting portion between adjacent ones of groove portions formed in the surface of said electrical supply member, each of said electrical supply portions of said electrical supply member provided in said second guide with respect to the wire electrode is formed by each of said groove portions, and retaining portions in a number identical to that of the number of said groove portions formed in the surface of each of said electrical supply members are formed on each of said electrical supply members for controlling rotation of said electrical supply member.

4. The wire electrical discharge apparatus according to claim 2, wherein a rotation stopping member disposed at an electrical supply portion formed in said electrical supply member provided in said first guide with respect to the wire electrode and a rotation stopping member diposed at an electrical supply portion formed in said electrical supply member provided in said second guide with respect to wire electrode are arranged at angles which are different by angle formed by said groove portion formed in said guide and an adjacent groove portion with respect to a central portion of said electrical supply member.

5. The wire electrical discharge apparatus according to claim 1, wherein material of each of said electrical supply members is formed of a powder sintered metal, and the surface of each of said electrical supply members is coated with a carbide or a nitride.

6. The wire electrical discharge apparatus according to claim 1, wherein attachment and detachment of each of said electrical supply members are effected by using a drawing-out member which engages said electrical supply member, and said drawing-out member is provided with a rotation stopping member formed of a resilient member and permitting indexing of an electricity-supplying position of said electrical supply member.

* * * * *